(12) United States Patent
Vallauri et al.

(10) Patent No.: US 7,872,197 B2
(45) Date of Patent: Jan. 18, 2011

(54) JOINING METHOD AND RELATED JUNCTION FOR ELECTRIC CABLES, TUBULAR COVERING SLEEVE FOR ELECTRIC-CABLE JUNCTIONS AND PROCESS FOR MANUFACTURING THE SAME

(75) Inventors: Ubaldo Vallauri, Monza (IT); Francesco Portas, Milan (IT)

(73) Assignee: Prysmian Cavi E Sistemi Energia S.r.l., Milan (IT)

( * ) Notice: Subject to any disclaimer, the term of this patent is extended or adjusted under 35 U.S.C. 154(b) by 128 days.

(21) Appl. No.: 12/087,128

(22) PCT Filed: Dec. 28, 2005

(86) PCT No.: PCT/IT2005/000767

§ 371 (c)(1),
(2), (4) Date: Oct. 9, 2008

(87) PCT Pub. No.: WO2007/074480

PCT Pub. Date: Jul. 5, 2007

(65) Prior Publication Data

US 2009/0218135 A1   Sep. 3, 2009

(51) Int. Cl.
*H01R 4/02* (2006.01)
(52) U.S. Cl. ...................... 174/88 R; 174/93
(58) Field of Classification Search .............. 174/73.1, 174/93, 88 R
See application file for complete search history.

(56) References Cited

U.S. PATENT DOCUMENTS

| | | | |
|---|---|---|---|
| 3,816,640 A | 6/1974 | Varner | |
| 4,383,131 A | 5/1983 | Clabburn et al. | |
| 4,822,952 A | 4/1989 | Katz et al. | |
| 5,753,861 A * | 5/1998 | Hansen et al. | 174/93 |
| 5,985,062 A * | 11/1999 | Vallauri et al. | 156/51 |
| 6,103,975 A | 8/2000 | Krabs et al. | |

(Continued)

FOREIGN PATENT DOCUMENTS

EP    0022660 A1    1/1981

(Continued)

OTHER PUBLICATIONS

Office Action dated Aug. 17, 2010 issued in corresponding Chinese Application No. 200580052440.0 and English translation thereof.

*Primary Examiner*—Chau N Nguyen
(74) *Attorney, Agent, or Firm*—Harness, Dickey & Pierce, P.L.C.

(57) ABSTRACT

A tubular covering sleeve for joints of electric cables may include a primary tubular body and a coating sheath. The primary tubular body may include at least one annular insert of semiconductive material integrated into at least one layer of insulating material. The coating sheath may include one or more layers of semiconductive material mechanically engaged in a condition of resilient radial expansion around the primary tubular body so as to exert a centripetal tightening action on the primary tubular body. A junction for electric cables may include devices for mutual connection between the conductors of the cables and a covering sleeve applied around the devices for mutual connection and around the cables. Each cable may include at least one conductor disposed in an insulating coating and a shielding coating externally applied to the insulating coating.

75 Claims, 5 Drawing Sheets

U.S. PATENT DOCUMENTS

2004/0209025 A1    10/2004    Kobayashi et al.

FOREIGN PATENT DOCUMENTS

| | | |
|---|---|---|
| EP | 0379056 A2 | 7/1990 |
| EP | 0 435 569 | 7/1991 |
| EP | 0 780 949 | 6/1997 |
| EP | 0 920 101 | 6/1999 |
| EP | 0 920 102 | 6/1999 |
| GB | 2 040 112 | 8/1980 |

* cited by examiner

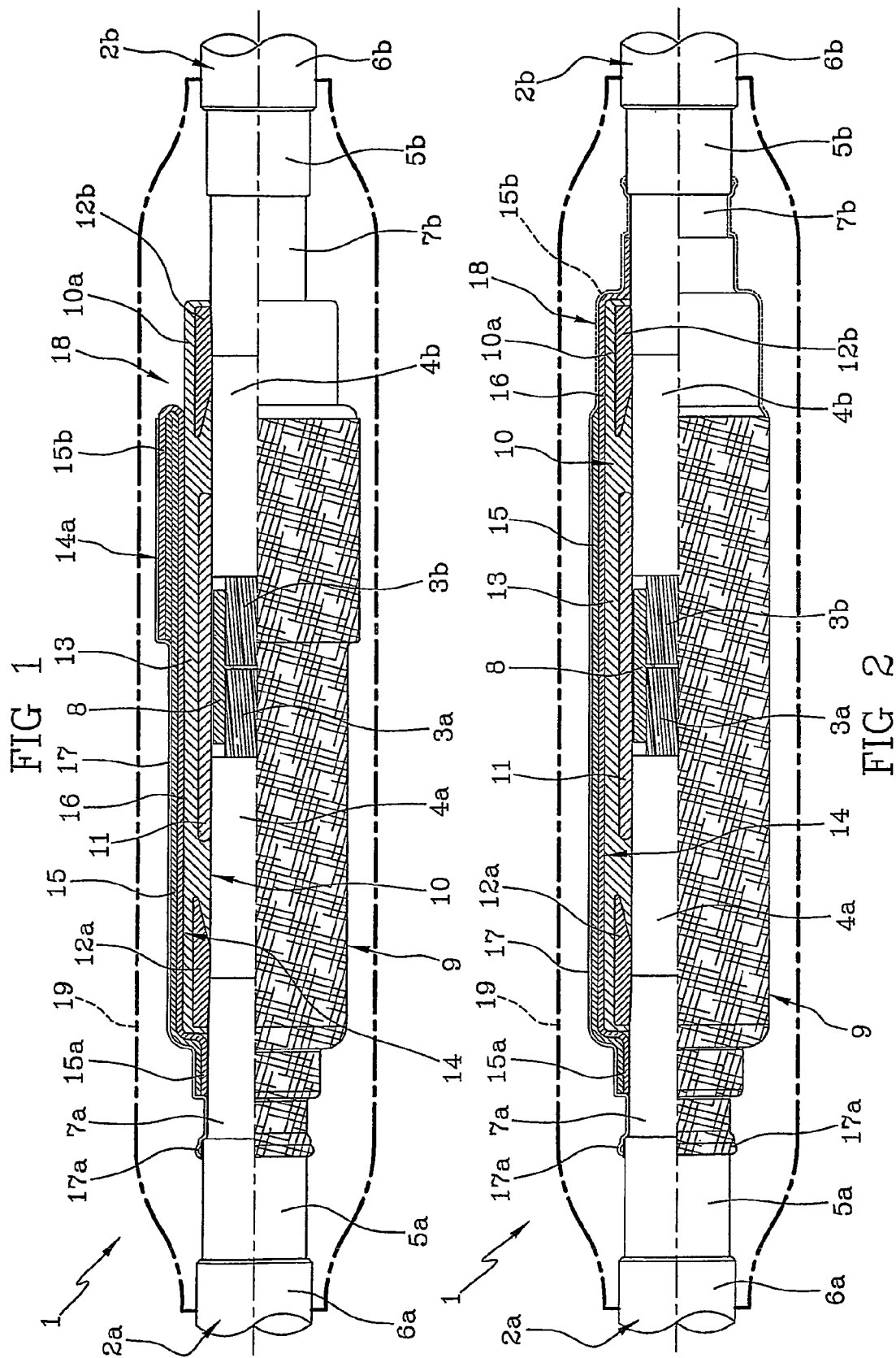

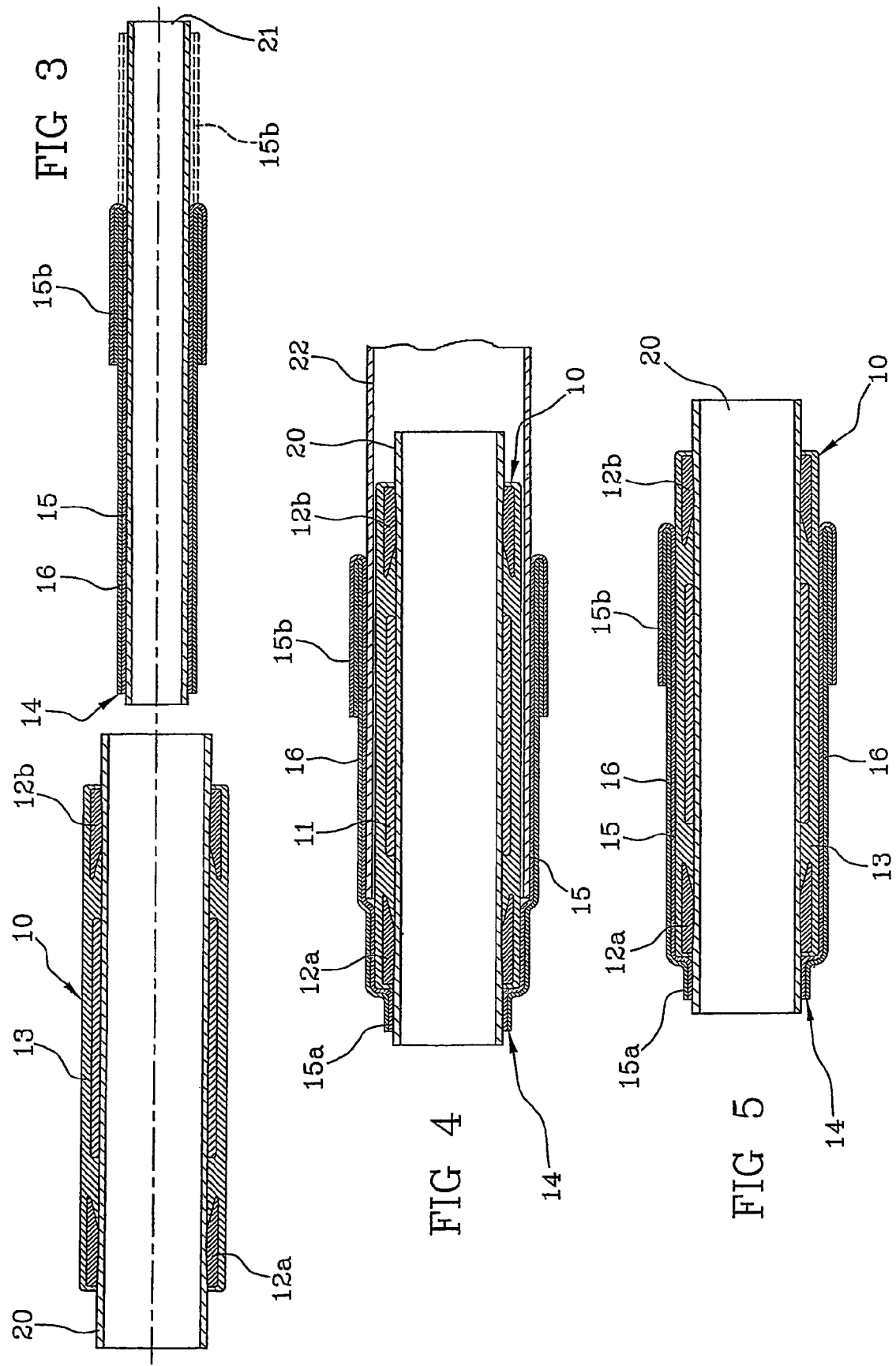

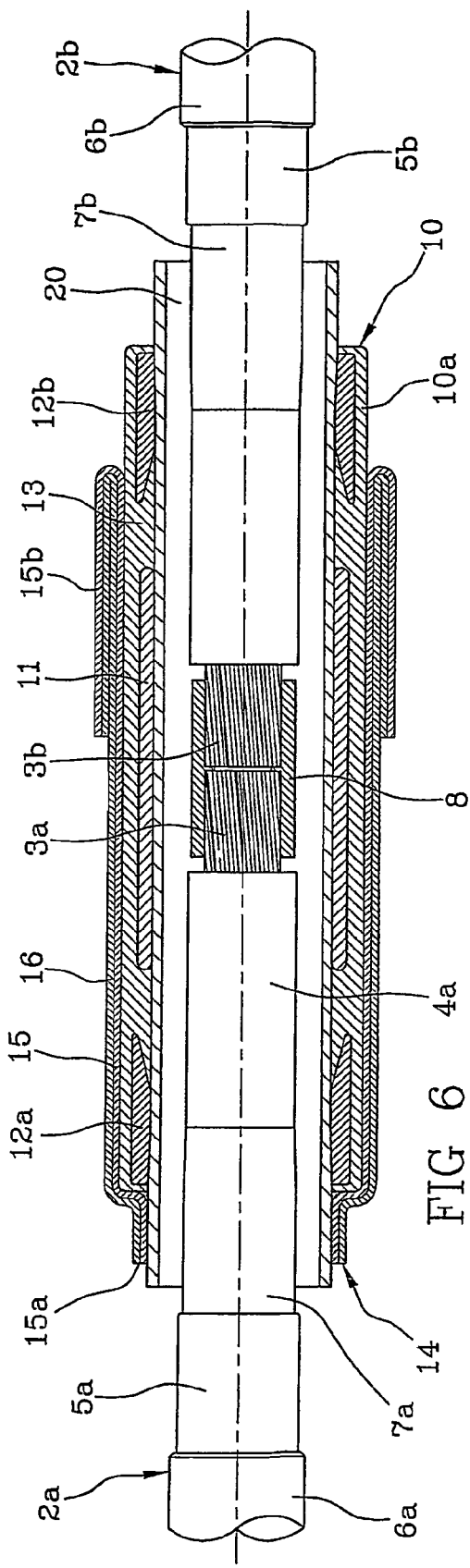
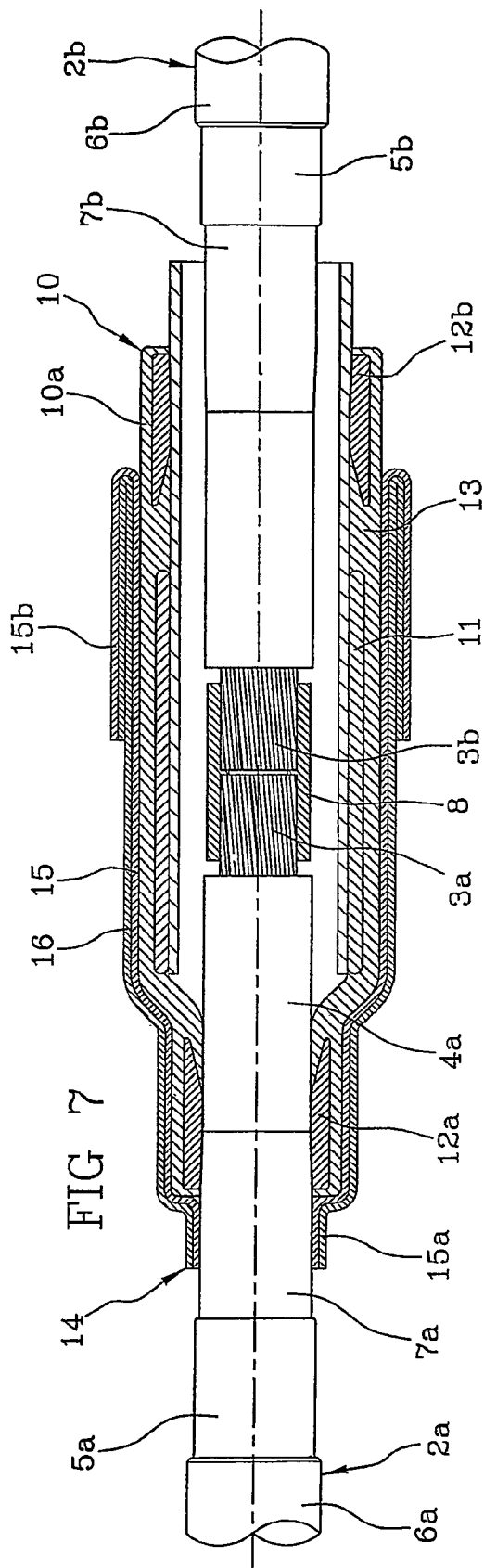

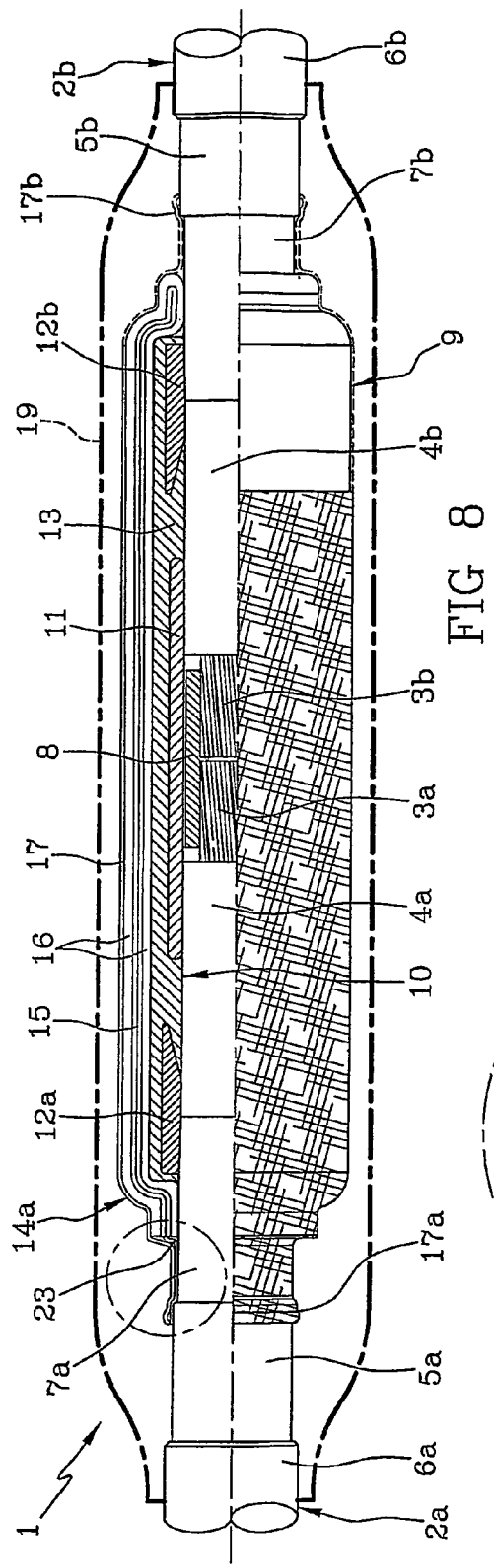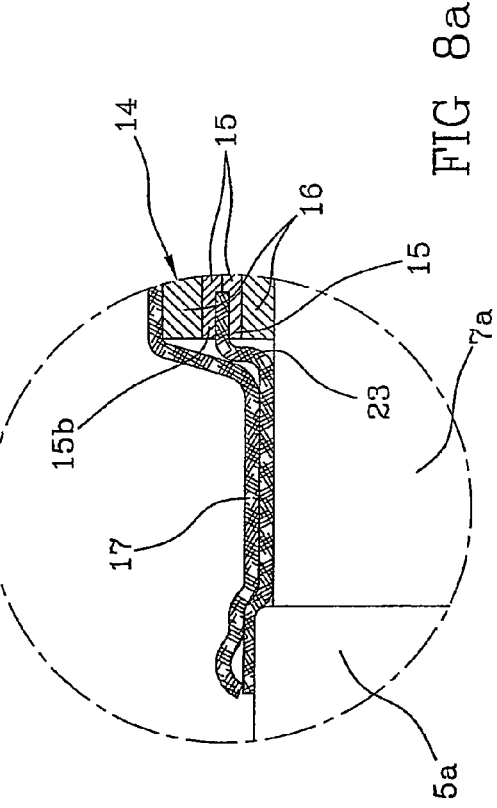
FIG 8
FIG 8a

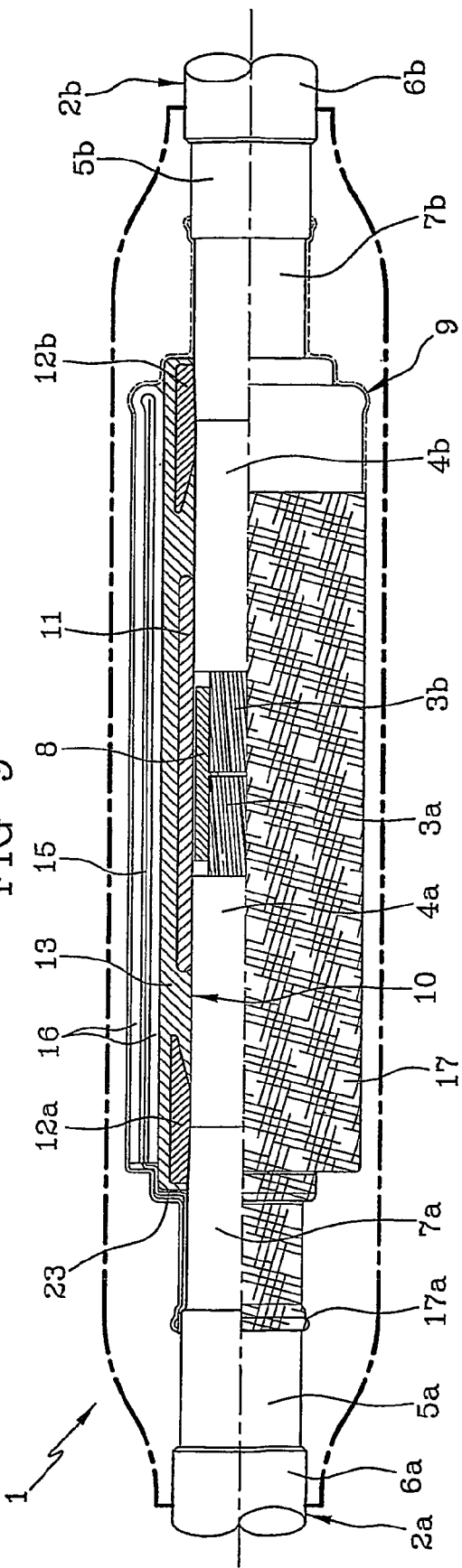
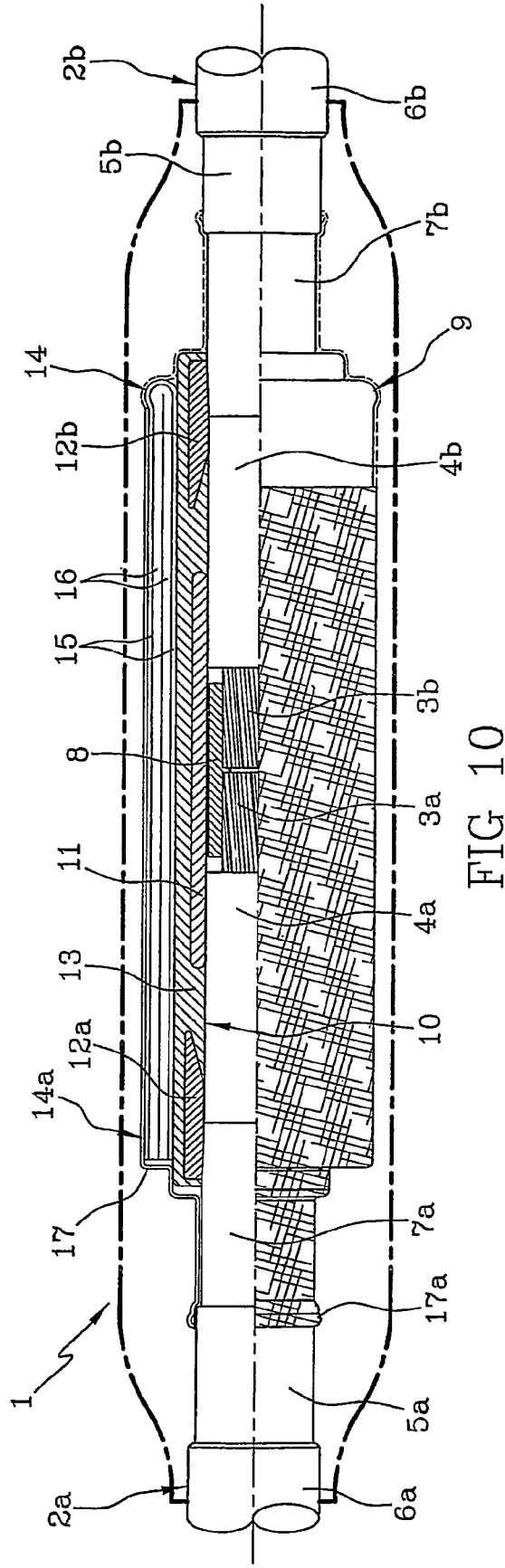

JOINING METHOD AND RELATED JUNCTION FOR ELECTRIC CABLES, TUBULAR COVERING SLEEVE FOR ELECTRIC-CABLE JUNCTIONS AND PROCESS FOR MANUFACTURING THE SAME

PRIORITY STATEMENT

This application is a national stage entry from International Application No. PCT/IT2005/000767, filed on Dec. 28, 2005, in the Receiving Office of the Italian Patent and Trademark Office, the entire contents of which are incorporated herein by reference.

FIELD OF THE INVENTION

The present invention relates to a method of splicing or joining electric cables together, as well as to a junction or joint obtainable by the above method.

The invention also relates to a tubular covering sleeve to be used for putting into practice the above mentioned method, and to a process for manufacturing said tubular covering sleeve.

The present invention is particularly (but not exclusively) adapted to restore an electric connection between cable sections for energy transport or distribution, more particularly for transport or distribution of high- or ultra high-voltage electric energy.

In the present specification the term "medium voltage" is used with reference to a voltage typically included between about 1 kV and about 30 kV, while the term "high voltage" refers to a voltage higher than 30 kV. The term "ultra high voltage" is used to define a voltage exceeding about 150 kV or 220 kV, until 500 kV or even beyond this value.

Splicing of electric cables in accordance with the present invention can involve cables either of the unipolar type (unipolar cables) or of the multipolar type (bipolar or three-pole cables, for example).

In addition, the electric cables spliced in accordance with the present invention are generally used for transmission or distribution of alternating current (AC).

The method and equipment in accordance with the present invention can be applied to any electric connection between cables being part of an electric network.

STATE OR THE ART

Cables for energy transport or distribution, in particular for transport or distribution of medium- and high-voltage energy, generally comprise, starting from a radially innermost position to a radially outermost position of the cable: a metal conductor, an inner semiconductive layer, an insulating layer, an outer semiconductive layer, a metal shield—usually made of aluminum, lead or copper—and an outer protective polymer sheath. The assembly consisting of the following constituent elements of the cable in the mentioned sequence: metal conductor, inner semiconductive layer, insulating layer and outer semiconductive layer, constitute a semifinished product usually referred to as "cable core".

For the purpose of splicing two electric cables, for example of the unipolar type, the ends of said cables are previously treated so that the constituent elements of the cables themselves are exposed on a portion thereof of a predetermined length. Subsequently the two cables are spliced forming an electric connection between the conductors of same, by welding or clamping the conductors for example, and subsequently positioning a tubular covering sleeve manufactured separately on the splicing region (i.e. the region where said conductors are spliced).

This tubular covering sleeve can be applied to the splicing region either in the form of a shrinkable tubular sleeve, by previously radially expanding the sleeve itself and subsequently causing shrinkage of same on the cable by means of heat (a heat-shrinkable sleeve) or through removal of a supporting element previously disposed inside the sleeve so as to keep said tubular sleeve, made of resilient material, in a radially expanded condition (a cold-shrinkable sleeve).

For example, document U.S. Pat. No. 4,822,952 discloses a heat-shrinkable tubular sleeve with tapering ends, having a layered structure comprising an inner semiconductive layer, a first insulating layer applied around the inner semiconductive layer, a first insulating layer applied around the inner semiconductive layer, a second insulating layer applied around the first insulating layer, and an outer semiconductive layer applied around the second insulating layer. The sleeve is fitted in an expanded condition on the cable joint, to be then heat-shrunk on the joint, with its ends tightened against the insulating layers of the cables and spaced apart from the semiconductive layers thereof. A conductive paint is applied to the ends of the sleeve to electrically connect the inner and outer semiconductive layers of the sleeve with the semiconductive layers of the cables. Then a metal layer consisting of a conductive tape for example, is applied externally of the sleeve to mutually connect the conductive shields of the cables.

Document U.S. Pat. No. 6,472,600 in the name of the same Applicant discloses a further junction arrangement comprising: a tubular rigid supporting element formed with two supporting portions, a cold-shrinkable tubular sleeve previously expanded on said supporting element and means for temporarily connecting said two supporting portions.

The tubular sleeve generally comprises a plurality of elements adapted to restore the electrical and mechanical continuity between the constituent elements of the cables in the splicing region of the latter. In particular, following a splicing operation between two electric cable sections, it is required that restoration of the electric continuity between the electric-shielding coatings of the cables be carried out.

In order to avoid energy dissipation by Joule effect along the electric transmission line, which dissipation is for example due to arising of electric currents induced in the shielding coatings by effect of the alternating electric current flowing along the conductors of the cables submitted to splicing, the splicing regions present along the electric transmission line are such set as to create along said line, suitable electrical interruption regions between the shielding coatings of said cables. Said interruption regions are technically defined as "sectionalisations".

In addition, in a multipolar electric line (a three-phase line, for example), at the splicing regions, the shielding coating of one phase of a first cable to be submitted to splicing is generally connected with the shielding coating of a different phase of a second cable to be joined to the first one, so as to create a cross-bonding connection between the shielding coatings of the first and second cables of the above mentioned electric line.

Document EP 920,101 discloses a splicing device according to which the shielding coatings belonging to two cables to be submitted to splicing are connected to the opposite ends of a tubular metal element extending around the splicing region, said tubular metal element being made of two longitudinal portions electrically insulated from each other in order to carry out a sectionalisation between said shielding coatings.

Document EP 920,102 discloses a further splicing device according to which sectionalisation is carried out by an insulating tubular sleeve radially interposed between two tubular shielding metal elements connected to the shielding coatings respectively of a first and a second cable to be submitted to splicing.

Document U.S. Pat. No. 4,424,410 discloses a covering sleeve comprising two adaptors each fitted on the end portion of one of the spliced cables, and an outer tubular element, axially put on the adaptors and on the splicing region interposed therebetween, by tight fit. Integrated into each adaptor by co-moulding is an insert of frusto-conical shape made of an electrically conductive material which is connected with the shielding coating of the respective cable. Co-moulded in the outer tubular element is a cylindrical insert of an electrically conductive material which is electrically connected with at least one of the conductive inserts arranged in the adaptors. Sectionalisation is obtained through arrangement of an electrical interruption between the conductive cylindrical insert and the conductive insert present in one of the adaptors, or between said conductive insert and the shielding coating present on the respective cable, during the co-moulding step (carried out when the outer tubular element and/or the conductive inserts are manufactured).

Document US 2004/0209025 discloses a cold-shrinkable sleeve obtained by unitary co-moulding, comprising a body of insulating material integrating an inner tubular insert, two frustoconical inserts of a semiconductive material disposed at the sleeve ends, and an outer coating layer of a semiconductive material. During the moulding step, interruptions are carried out on the ends of the outer semiconductive layer, leaving the insulating material uncovered at the frustoconical inserts, in order to make the desired sectionalisation.

SUMMARY OF THE INVENTION

The Applicant has perceived the necessity to simplify the production processes of the tubular sleeves to be used close to the splicing region between at least one pair of electric cables. In particular, the Applicant has sensed the necessity to simplify the splicing methodology between at least one pair of electric cables where provision of an interruption in the shielding coatings of the cables is required in order to carry out sectionalisation of the shield at the splicing region.

In addition, the Applicant has perceived the necessity to prepare a tubular sleeve that can suit joints of cables of different diameters and that at the same time can be used both in case of joints that do not require sectionalisation and with joints involving sectionalisation.

The Applicant has found that the production and installation processes for tubular sleeves known in the art can be advantageously simplified if connection between the shielding coating of the cables to be submitted to splicing is carried out by means of a coating sheath comprising at least one layer of semiconductive material that in case of need can be turned over or partly removed in order to enable the semiconductive layer itself to receive the above mentioned sectionalisation.

Accordingly, in a first aspect the present invention relates to a method of splicing or joining a pair of electric cables together, each cable comprising at least one conductor, an insulating coating at a position radially external to said at least one conductor and an electric-shielding coating applied at a radially external position to said insulating coating, said method comprising the steps of: providing a tubular covering sleeve in a resiliently radially expanded condition, said sleeve comprising: a primary tubular body having one or more annular inserts of semiconductive material integrated into at least one layer of insulating material; and a coating sheath comprising at least one layer of semiconductive material, said coating sheath being disposed at a radially external position to said primary tubular body; disposing said radially expanded tubular covering sleeve to a substantially coaxial position around one of said cables; electrically connecting each conductor of said at least one pair of cables and obtaining a splicing region between the same; positioning the radially expanded covering sleeve around the splicing region; causing radial shrinkage of the covering sleeve on said cables in the splicing region; making an electric connection between a first end portion of the layer of semiconductive material of said coating sheath and the electric-shielding coating of at least one of said cables, wherein the step of providing a radially expanded tubular covering sleeve comprises the steps of: preparing the primary tubular body; preparing the coating sheath; engaging the coating sheath in such a condition of radial resilient expansion around the primary tubular body, that the coating sheath engaged on the primary tubular body exerts a centripetal tightening action on the primary tubular body itself.

In another aspect, the present invention relates to a joint between at least one pair of electric cables each comprising at least one conductor, one insulating coating in a position radially external to said at least one conductor and a shielding coating externally applied to the insulating coating, said joint comprising: devices for mutual connection between the conductors of said at least one pair of cables; a covering sleeve applied around the connection devices and around said cables, wherein said covering sleeve comprises: a primary tubular body comprising one or more annular inserts of semiconductive material integrated into at least one layer of insulating material; a coating sheath comprising at least one layer of semiconductive material engaged in a condition of radial resilient expansion around the primary tubular body so as to exert a centripetal tightening action on the primary tubular body itself.

In accordance with a further aspect of the invention, it is proposed a process for manufacturing a tubular covering sleeve for electric cable joints, said process comprising the steps of: preparing a primary tubular body comprising one or more annular inserts of semiconductive material integrated into at least one layer of insulating material; preparing a coating sheath comprising at least one layer of semiconductive material; engaging the coating layer in a resiliently radially expanded relationship around the primary tubular body, so that the coating sheath engaged on the primary tubular body exerts a centripetal tightening action on the primary tubular body itself.

It is a still further object of the invention to provide a tubular covering sleeve for electric cable joints, said tubular sleeve comprising: a primary tubular body comprising one or more annular inserts of semiconductive material integrated into at least one layer of insulating material; a coating sheath comprising at least one layer of semiconductive material engaged in a condition of radial resilient expansion around the primary tubular body so as to exert a centripetal tightening action on the primary tubular body itself.

Further features and advantages will become more apparent from the detailed description of some preferred, but not exclusive, embodiments of a method of splicing electric cables and of the related joint, as well as of a tubular covering sleeve for electric-cable joints and of the process for manufacturing said sleeve in accordance with the present invention.

BRIEF DESCRIPTION OF THE DRAWINGS

This description will be set out hereinafter with reference to the accompanying drawings, given by way of non-limiting example, in which:

FIG. 1 is a partial section view of an electric cable joint, made in accordance with the present invention;

FIG. 2 is a partial section view of an electric cable joint made in accordance with a possible alternative embodiment of the invention;

FIG. 3 diagrammatically shows a working step in longitudinal section, carried out on a coating sheath to carry out sectionalisation of the joint to be obtained;

FIG. 4 shows a step during which the coating sheath is about to be fitted on a main body of a covering sleeve for obtaining a joint in accordance with the invention;

FIG. 5 shows an end step in the manufacture of a covering sleeve;

FIG. 6 shows a step in which the sleeve in FIG. 5 is coaxially fitted on one of the electric cables to be spliced;

FIG. 7 shows a step in which the sleeve is about to be engaged on the splicing region between electric cables;

FIG. 8 shows a preferential embodiment of the present invention;

FIG. 8a shows a detail of FIG. 8 to an enlarged scale;

FIG. 9 shows a variant of the embodiment shown in FIG. 8;

FIG. 10 shows a further preferential embodiment of the present invention.

DETAILED DESCRIPTION OF THE PREFERRED EMBODIMENTS

With reference to the drawings, an electric cable joint in accordance with the present invention has been generally identified by reference numeral 1.

In the embodiment shown, joint 1 is obtained between a first and a second electric cables 2a, 2b for transport of high-voltage energy. Each electric cable 2a, 2b comprises at least one conductor 3a, 3b and an insulating coating 4a, 4b applied to the conductor 3a, 3b at a radially external position. An electric-shielding coating 5a, 5b is applied at a radially external position to the insulating coating 4a, 4b. The shielding coating 5a, 5b is in turn covered with at least one protection sheath 6a, 6b of electrically insulating plastic or elastomer material.

Preferably, each of the electric cables 2a, 2b further has at least one semiconductive coating 7a, 7b radially interposed between the insulating coating 4a, 4b and the shielding coating 5a, 5b.

At the splicing region, the ends of each cable 2a, 2b are treated in such a manner that the conductor 3a, 3b and each of the coatings 4a, 4b, 5a, 5b, 7a, 7b axially project by a predetermined amount relative to the adjacent radially outermost coating, as clearly shown in FIGS. 1 and 2.

The conductors 3a, 3b of the axially aligned cables 2a, 2b are mutually connected by suitable connection devices 8 such as a tubular metal connector welded or clamped on said conductors 3a, 3b. A covering sleeve preferably of elastomer material and generally denoted at 9 is applied around the connection devices 8 and to the ends of the electric cables 2a, 2b. Alternatively, the covering sleeve 9 is made of a heat-shrinkable material.

The covering sleeve 9 essentially comprises a primary tubular body 10 including one or more annular inserts 11, 12a, 12b of semiconductive material, integrated into at least one layer of insulating material 13. In more detail, in the example shown a first substantially cylindrical semiconductive insert 11 is provided which is disposed at a coaxially centred position relative to the ends of conductors 3a, 3b and appears internally of the primary tubular body 10. Said first semiconductive insert 11 is disposed at a radially external position to the connection devices 8 so that it covers the splicing region of conductors 3a, 3b and, at least partly, the insulating coatings 4a, 4b of each cable 2a, 2b. Said first semiconductive insert 11 is generally known as "electrode".

Also provided is a pair of second semiconductive inserts 12a, 12b of annular conformation, that are symmetrically spaced apart from the first insert 11 and appear internally of the primary tubular body 10 to each act in contact relationship against the insulating coating 4a, 4b and the ends of the semiconductive coating 7a, 7b of the respective cable 2a, 2b. Said second semiconductive inserts 12a, 12b are generally known as "deflectors" or "cups".

Associated with the primary tubular body 10 at a radially external position is a coating sheath 14 mechanically engaged in a resiliently radially expanded condition around the primary tubular body itself.

To the aims of the present specification and the claims, the expression "mechanically engaged" means that the coating sheath 14 and primary tubular body 10 are linked with each other in the region of mutual contact in a mechanical manner. In other words, the coating sheath 14 and primary tubular body 10 are not linked with each other by a bond of the chemical type as it generally happens where an extrusion or moulding process is used to carry out coupling of said elements.

In more detail, the coating sheath 14 is made separately of the primary tubular body 10 and in a rest condition, i.e. in the absence of stresses, it has an inner diameter smaller than the outer diameter of the primary body. As better clarified in the following, the coating sheath 14 is subsequently engaged around the primary tubular body 10 so that, when engagement has been completed, the sheath keeps in a condition of radial elastic tensioning due to the larger diameter of the primary tubular body relative to the inner diameter of the sheath at rest. Consequently, the coating sheath 14 engaged on the primary tubular body 10 exerts a constant centripetal tightening action on the primary tubular body itself.

The coating sheath 14 comprises at least one layer of semiconductive material 15 electrically connected to the semiconductive coating 7a, 7b and/or the electric-shielding coating 5a, 5b of at least one of the electric cables 2a, 2b. The electric connection can be of the direct type as shown in FIG. 1 for example, in which the layer of semiconductive material 15 of the coating sheath 14 has a first end portion 15a axially projecting with respect to the primary tubular body 10, to directly come into contact with the semiconductive coating 7a of the electric cable 2a. Alternatively, the above electric connection can be of the indirect type in which the layer of semiconductive material 15 of the coating sheath 14 is connected to the semiconductive coating 7a of the electric cable 2a and/or to the shielding coating 5a through an auxiliary conductive element 23 (FIGS. 8, 8a e 9).

This electric connection aims at placing the layer of semiconductive material 15 of the coating sheath 14 to the same electric potential as the shielding coating 5a, 5b of cable 2a, 2b.

At least one layer of preferably electrically insulated elastomer material 16 can be advantageously coupled with the semiconductive layer 15 of the coating sheath 14. The layer of elastomer material 16 is particularly advantageous because it ensures a suitable tightening action of the coating sheath 14 on the primary tubular body 10 and, at the same time, helps in increasing the tightening action of the primary tubular body 10 on the splicing region.

In accordance with a first embodiment, the layer of elastomer material 16 is coupled at a radially external position relative to the semiconductive layer 15, as exemplified in FIG. 1.

In accordance with a further embodiment, the layer of elastomer material 16 is coupled at a radially internal position relative to the semiconductive layer 15, as shown in FIG. 2.

Around the coating sheath 14 there is arranged at least one electric shielding element 17 preferably extending at least over the whole extension of the semiconductive layer 15 and having at least one first end 17a electrically connected to the shielding coating 5a, 5b of one of the electric cables 2a, 2b. The electric shielding element 17 consisting of an artifact made of wires of copper or other suitable material, extends at least partly against the semiconductive coating 7a of the electric cable 2a, along a section included between the end of the shielding coating 5a and the adjacent end of the coating sheath 14 belonging to the covering sleeve 9. When an electric interruption is wished between the shielding layers 5a, 5b of the spliced electric cables 2a, 2b, the extension of the electric shielding element 17 is cut out to a desired distance from the shielding layer 5b of the second electric cable 2b. If on the contrary, the electric interruption between the shielding coatings 5a, 5b is not required, the shielding element 17 will extend over the whole extension of the joint and will be connected to the shielding coatings 5a, 5b of both the electric cables 2a, 2b, as exemplified in chain line in FIG. 2 and in FIGS. 8 to 10.

In accordance with the present invention, the so-called "sectionalisation" 18 is made along the semiconductive layer 15 for the purpose of enabling said electric interruption between the semiconductive layers 7a, 7b and/or the shielding layers 5a, 5b of the spliced electric cables 2a, 2b. To this aim in accordance with the embodiments shown in FIGS. 1 to 7, an end portion 10a of the primary tubular body 10 is caused to axially project relative to the semiconductive layer 15 of the coating sheath 14, on the opposite side from the first end portion 15a. The end portion 10a axially projecting relative to the semiconductive layer 15 (and that therefore is not coated with said semiconductive layer 15) has a maximum axial extension corresponding to the maximum axial distance of the second semiconductive insert 12b present close to the end of the primary tubular body. In other words, the axially internal end of the second semiconductive insert 12b is, in a limit condition, in a position of substantial radial alignment with the end of the semiconductive layer 15 of the coating sheath 14 and of the electric shielding element 17 applied thereto.

In the embodiment shown in FIG. 1 at the sectionalisation 18, the coating sheath 14, or at least the semiconductive layer 15 thereof, has an end portion 14a turned up on the coating sheath 14 itself, so that the axial extension of the semiconductive layer 15 along the primary tubular body 10 is cut at an axially internal position relative to the end of the primary tubular body 10.

In accordance with a further embodiment shown in FIG. 2, the axial extension of the coating sheath 14, or at least of the semiconductive layer 15 thereof, is cut at an axially internal position relative to the end of the primary tubular body 10, in the absence of a turned-up portion of the end portion of said sheath.

Generally, also associated with joint 1 is at least one protective element 19 of electrically insulating material, applied around the covering sleeve 9 and extending as far as covering the end portions of the protection sheaths 6a, 6b present on the respective cables 2a, 2b. Preferably, said protective element 19 is made of heat-shrinkable material.

In accordance with the present invention, the process for manufacturing the covering sleeve 9 contemplates separate manufacture of the primary tubular body 10 and the coating sheath 14 and subsequent coupling of the primary tubular body with said sheath.

For instance, the primary tubular body 10 can be obtained by an injection-moulding process of the layer of insulating material 13 to surround the inserts of semiconductive material 12a, 12b previously arranged within the mould.

The coating sheath 14 can be manufactured by co-extruding the semiconductive layer 15 and the layer of elastomer material 16 in order to achieve mutual coupling of said layers.

Alternatively, the layer of elastomer material 16 can be made separately of the layer of semiconductive material 15 and mechanically coupled therewith in a subsequent process step, when the primary tubular body 10 is already in the radially expanded condition on the primary tubular support 20, for example. This solution is particularly advantageous in case of high- or ultra high-voltage splicing where the concerned diameters and thicknesses are particularly high. In this event, in fact, the availability of two distinct layers (the semiconductive layer 15 and insulating layer 16) put in place by interference fit during two distinct steps of the process enables the encircling force of the whole coating sheath 14 around the primary tubular body 10 to be increased.

The primary tubular body 10 is set in a radially expanded condition, ready to be subsequently used on making the joint between cables 2a, 2b, as described in detail in the following.

In the embodiments shown in the figures, sleeve 9 is of the cold-shrinkable type and radial expansion of the primary tubular body 10 is carried out by engagement of the primary tubular body in a resiliently expanded condition on a primary tubular support 20, preferably of plastic material, as shown in FIGS. 3 to 7.

The primary tubular support 20 keeps in engagement within the primary tubular body 10 until the covering sleeve 9 is operatively used in making the joint between cables 2a, 2b.

The coating sheath 14, and in particular the semiconductive layer 15 of same, initially has an axial extension larger than the axial extension of the primary tubular body 10.

In accordance with the present invention, working is carried out for the purpose of moving a second end portion 15b of the semiconductive layer 15 apart from the geometric axis of the coating sheath 14, in order to obtain the above mentioned sectionalisation 18.

According to the example shown in FIGS. 1 and 3 to 7, as well as to each of the preferential solutions seen in FIGS. 8 to 10, moving apart of the end portion 15b of the semiconductive layer 15 is carried out by turning up the coating sheath 14 at least at the end portion 14a of the sheath itself.

In accordance with the embodiments shown in FIGS. 1, 3 to 7 and 10, the layer of insulating material 16 is interposed in the turned-up portion formed by the semiconductive layer 15 by mutually spacing apart the turned-up end portion 15b from the radially innermost remaining portion of the semiconductive layer 15. On the contrary, in the embodiments shown in FIGS. 8 and 9, it is the layer of semiconductive material 15 that is interposed in the turned-up portion formed by the insulating layer 16 as a result of said turning-up.

In a further embodiment shown in FIG. 2, moving apart of the end portion of the semiconductive layer 15 takes place through material removal from the semiconductive layer 15, by mechanical abrasion of the semiconductive material for example, or by a cutting operation on the semiconductive layer of the coating sheath 14.

Preferably, moving apart of the end portion of the semiconductive layer 15 is carried out through turning-up of the coating sheath 14.

To this aim, an auxiliary cylindrical support 21, preferably hollow and of an outer diameter substantially equal to the inner diameter of the coating sheath 14 in a rest condition, is advantageously introduced into the sheath itself to facilitate working of same. As diagrammatically shown in FIG. 3 with reference to the embodiment seen in FIG. 1, the coating sheath 14 is previously disposed on said auxiliary tubular support for the whole axial extension of the sheath itself. Subsequently, the end portion 14a of the sheath 14 (see the portion in chain line in FIG. 3) is turned up upon itself to enable accomplishment of the sectionalisation 18 of joint 1, once said sheath has been fitted on the primary tubular body 10.

Turning-up of the coating sheath 14 can be carried out following any desired width, depending on requirements.

FIGS. 8 to 10 show some preferential solutions of the invention, in which the coating sheath 14 is fully turned up upon itself. In other words, turning-up of the coating sheath 14 is carried out until bringing the second end 15b of the semiconductive layer 15 in axial alignment with the first end 15a.

In accordance with FIG. 8, the coating sheath 14 axially projects from opposite sides relative to the primary body 10. In the embodiment in FIG. 8 the layer of semiconductive material 15 is disposed at a radially external position to the layer of insulating material 16, so as to be fully enclosed in the turned-up portion of the coating sheath 14.

In further embodiments shown in FIGS. 9 and 10 the opposite ends of the primary body 10 axially project relative to the turned-up coating sheath 14. In this case too however, the turned-up coating sheath 14 substantially covers the whole length of the primary tubular body.

In the embodiment in FIG. 8, the centripetal tightening action exerted by the coating sheath 14 advantageously helps in increasing the encircling force of the primary tubular body 10 on the splicing region, over the whole length of the primary tubular body.

Preferably, working of the coating sheath 14 to obtain moving apart of the end portion of the semiconductive layer 15 is carried out before coupling the coating sheath with the primary tubular body 10.

According to a further alternative embodiment (not shown), working of the coating sheath 14 is carried out during a step following coupling of the sheath itself with the primary tubular body 10.

In more detail, working of the coating sheath 14 can be carried out at the moment the primary tubular body 10 (already coupled with the coating sheath 14) is in a rest condition (i.e. it has not yet been submitted to radial expansion for fitting on the primary tubular support 20).

Alternatively, working of the coating sheath 14 can be carried out at the moment the primary tubular body 10 (already coupled with the coating sheath 14) is in a radially expanded condition, already supported on the primary tubular support 20. In the last-mentioned case, the primary tubular body 10 also performs the function of a supporting element for working of the coating sheath 14 so that the auxiliary cylindrical support 21 is no longer necessary.

In order to allow engagement of the coating sheath 14 on the primary tubular body 10, said sheath is preferably expanded starting from the rest condition in which the sheath has an inner diameter that is smaller than the outer diameter of the primary tubular body 10 as shown in FIG. 3, to a radially-expanded condition at which the inner diameter of the sheath is larger than the outer diameter of the primary tubular body 10. This expansion step can be carried out in a manner known by itself, through engagement of the coating sheath 14 on a suitable expanding mandrel 22 shown in FIG. 4.

Subsequently, the coating sheath 14, in a radially expanded condition and supported on said expanding mandrel 22, is disposed in a coaxial position with the primary tubular body 10. Then a radial shrinkage of the sheath itself is caused to tighten it in a centripetal manner on the primary tubular body 10.

The radial shrinkage can be carried out by removing the expanding mandrel 22 from the coating sheath 14 positioned around the primary tubular body 10, as shown in FIG. 4, so that the sheath itself can resiliently shrink on the primary body 10, as shown in FIG. 5.

Alternatively, sheath 14 can be made of a heat-shrinkable material, so as to cause radial shrinkage of same by means of a heating action on the sheath itself.

According to a further alternative embodiment, working of the coating sheath 14, for moving apart of the end portion 15b of the semiconductive layer 15, is carried out during the step at which the sheath is radially expanded (being supported on the expanding mandrel 22, for example), before carrying out radial shrinkage of the sheath itself to enable coupling of same with the primary tubular body 10.

As mentioned above, an alternative embodiment contemplates that working of the coating sheath 14 for carrying out the sectionalisation 18, be executed after the coating sheath has been shrunk against the outer surface of the primary tubular body 10. In this case, according to the embodiment in FIG. 2, due to the presence of the layer of elastomer material 16 applied at a radially internal position to the coating sheath 14, the insulating layer 13 of the primary tubular body 10 is advantageously protected against undesirable damages that can be caused by the action of the tools (adapted to abrade or engrave the semiconductive material) used during working of the sheath 14.

In accordance with a further aspect of the present invention, in the manufacture of joint 1 between the electric cables 2a, 2b it is provided that, in a step prior to connection of conductors 3a, 3b of said cables, the covering sleeve 9—set in a radially expanded condition—is fitted in a substantially coaxial position around one of said cables. During this step the primary tubular body 10 and the coating sheath 14 are preferably already assembled together, as shown in FIG. 6.

Alternatively, the coating sheath 14, already submitted to working or not yet submitted to working for obtaining the sectionalisation 18, is separated from the primary tubular body 10 and supported by the expanding mandrel 22. In this case, the primary tubular body 10 in a resiliently radially expanded condition (being positioned on the primary tubular support 20) and the coating sheath 14 in a resiliently radially expanded condition (being positioned on the expanding mandrel 22) are fitted in a substantially coaxial position around at least one of said cables 2a, 2b. Preferably, the resiliently expanded primary tubular body 10 is disposed around one of said cables 2a, 2b while the resiliently expanded coating sheath 14 is disposed around the second one of said cables.

Subsequently the electric and mechanical connection between conductors 3a, 3b of cables 2a, 2b is carried out with the aid of the connection devices 8.

After the radially expanded covering sleeve 9 has been disposed to a substantially centred position around the splicing region, a radial shrinkage of sleeve 9 on cables 2a, 2b is caused. Said radial shrinkage is preferably carried out by pulling the primary tubular support 20 out of the primary tubular body 10, as shown in FIG. 7.

Alternatively, as mentioned above, the sleeve 9 can be made of a heat-shrinkable material. In this case, shrinkage of sleeve 9 can take place by a heating action on the sleeve itself.

If engagement of the tubular sleeve 9 on cables 2a, 2b is carried out when the coating sheath 14 is still disposed on the expanding mandrel 22, radial shrinkage of the coating sheath 14 on the primary tubular body 10 preferably takes place after the primary tubular body has been shrunk on cables 2a, 2b.

At this point of the process, if working of the coating sheath 14 for carrying out the sectionalisation 18 has not yet been executed, moving apart of the end portion 15b of the semiconductive layer 15 can be done subsequently to shrinkage of the coating sheath 14 and the primary tubular body 10 on cables 2a, 2b at the splicing region.

In accordance with the present invention, this splicing method can apply both where the sectionalisation 18 is to be carried out, and where said sectionalisation is not necessary. In fact, in the last-mentioned case, the end portions of the coating sheath 14 appear to symmetrically project from the axially opposite ends of the primary tubular body 10, as exemplified in chain line in FIG. 2.

When shrinkage of the covering sleeve 9 on cables 2a, 2b has been completed in the splicing region, the electric shielding element 17 is fitted around the coating sheath 14 and connected to the shielding coating 5a of the electric cable 2a, opposite to the end portion 10a of the primary tubular body 10 projecting from the coating sheath 14 itself. Should the layer of semiconductive material 15 radially appear externally of the coating sheath 14, whether it is turned up or not, application of the shielding element also causes the electric connection of the layer of semiconductive material with the electric-shielding coating 5a, 5b of at least one of said cables 2a, 2b.

Then the protective layer 19 is applied at a radially external position to the tubular sleeve 9 to complete manufacture of joint 1.

The invention claimed is:

1. A method of joining at least one pair of electric cables together, each cable comprising at least one conductor, an insulating coating at a position radially external to the at least one conductor, and an electric-shielding coating applied at a radially external position to the insulating coating, the method comprising:
    providing a tubular covering sleeve in a resiliently radially expanded condition, the tubular covering sleeve comprising:
        a primary tubular body comprising at least one annular insert of semiconductive material integrated into at least one layer of insulating material; and
        a coating sheath comprising one or more layers of semiconductive material, wherein the coating sheath is disposed at a radially external position to the primary tubular body;
    disposing the radially expanded tubular covering sleeve at a substantially coaxial position around one of the cables;
    electrically connecting each conductor of the at least one pair of cables and obtaining a splicing region between the at least one pair of cables;
    positioning the radially expanded tubular covering sleeve around the splicing region;
    causing radial shrinkage of the tubular covering sleeve on the at least one pair of cables in the splicing region;
    making an electric connection between the one or more layers of semiconductive material of the coating sheath and the electric-shielding coating of at least one of the cables; and
    moving an end portion of the one or more layers of semiconductive material of the coating sheath apart from a geometric axis of the coating sheath to carry out a sectionalization along the one or more layers of semiconductive material;
    wherein providing a tubular covering sleeve comprises:
        preparing the primary tubular body;
        preparing the coating sheath; and
        mechanically engaging the coating sheath in, a condition of radial resilient expansion around the primary tubular body so that the coating sheath engaged on the primary tubular body exerts a centripetal tightening action on the primary tubular body.

2. The method of claim 1, wherein mechanically engaging the coating sheath around the primary tubular body comprises:
    expanding the coating sheath from a rest condition, in which an inner diameter of the coating sheath is smaller than an outer diameter of the primary tubular body, to a radially expanded condition, in which the inner diameter of the coating sheath is larger than the outer diameter of the primary tubular body;
    positioning the coating sheath around the primary tubular body in a coaxial relationship; and
    causing radial shrinkage of the coating sheath on the primary tubular body.

3. The method of claim 2, wherein disposing the radially expanded tubular covering sleeve comprises:
    disposing the primary tubular body in a resiliently radially expanded condition on a primary tubular support.

4. The method of claim 3, wherein disposing the primary tubular body on the primary tubular support is carried out before positioning the coating sheath around the primary tubular body in coaxial relationship.

5. The method of claim 2, wherein expanding the coating sheath is carried out by engagement of the coating sheath in resiliently expanded condition on an expanding mandrel.

6. The method of claim 5, wherein causing radial shrinkage of the coating sheath is carried out by axially pulling the expanding mandrel out of the coating sheath.

7. The method of claim 1, wherein mechanically engaging the coating sheath around the primary tubular body is carried out before disposing the radially expanded tubular covering sleeve at a substantially coaxial position around one of the cables.

8. The method of claim 1, wherein mechanically engaging the coating sheath around the primary tubular body is carried out after disposing the radially expanded tubular covering sleeve at a substantially coaxial position around one of the cables.

9. The method of claim 1, wherein before moving an end portion apart, the one or more layers of semiconductive material of the coating sheath are extended over an axial extension larger than an axial extension of the primary tubular body.

10. The method of claim 1, wherein moving an end portion apart is carried out by removing the one or more layers of semiconductive material of the coating sheath at the end portion.

11. The method of claim 10, wherein removing the one or more layers of semiconductive material is carried out by mechanical abrasion.

12. The method of claim 1, wherein moving an end portion apart is carried out by turning up the end portion over the coating sheath.

13. The method of claim 12, wherein first and second end portions of the one or more layers of semiconductive material are brought into substantially mutual axial alignment relationship following turning up the end portion.

14. The method of claim 1, wherein moving an end portion apart is carried out before mechanically engaging the coating sheath.

15. The method of claim 1, wherein moving an end portion apart is carried out before causing radial shrinkage of the tubular covering sleeve.

16. The method of claim 1, wherein moving an end portion apart is carried out after causing radial shrinkage of the tubular covering sleeve.

17. The method of claim 1, wherein disposing the radially expanded tubular covering sleeve comprises:
    coupling at least one layer of elastomer material with the one or more layers of semiconductive material of the coating sheath.

18. The method of claim 17, wherein the at least one layer of elastomer material is coupled internally of the one or more layers of semiconductive material.

19. The method of claim 17, wherein the at least one layer of elastomer material is coupled externally of the one or more layers of semiconductive material.

20. The method of claim 17, wherein coupling at least one layer of elastomer material comprises:
    co-extruding the at least one layer of elastomer material with the one or more layers of semiconductive material of the coating sheath.

21. The method of claim 17, wherein coupling at least one layer of elastomer material comprises:
    mechanically coupling the at least one layer of elastomer material with the one or more layers of semiconductive material.

22. The method of claim 1, wherein disposing the radially expanded tubular covering sleeve is carried out after mechanically engaging the coating sheath around the primary tubular body.

23. The method of claim 1, further comprising:
    carrying out application, around the coating sheath, of an electric-shielding element electrically connected with the electric-shielding coating of at least one of the cables.

24. The method of claim 23, wherein the electric-shielding element at least partly contacts a semiconductive coating of at least one of the cables, and
    wherein the semiconductive coating is radially interposed between the electric-shielding coating of the at least one of the cables and the insulating coating of the at least one of the cables.

25. The method of claim 23, wherein making an electrical connection is carried out by bringing the electric-shielding element at least partly into contact with the one or more layers of semiconductive material.

26. The method of claim 1, wherein making an electrical connection is carried out by electrically connecting the one or more layers of semiconductive material to a semiconductive coating of at least one of the cables, and
    wherein the semiconductive coating is radially interposed between the electric-shielding coating of the at least one of the cables and the insulating layer of the at least one of the cables.

27. The method of claim 1, further comprising:
    applying a protective layer at a position radially external to the tubular covering sleeve.

28. A junction for electric cables, each cable comprising at least one conductor disposed in an insulating coating and a shielding coating externally applied to the insulating coating, the junction comprising:
    devices for mutual connection between the conductors of the cables; and
    a covering sleeve applied around the devices for mutual connection and around the cables;
    wherein the covering sleeve comprises:
        a primary tubular body comprising at least one annular insert of semiconductive material integrated into at least one layer of insulating material; and
        a coating sheath comprising one or more layers of semiconductive material mechanically engaged in a condition of radial resilient expansion around the primary tubular body so as to exert a centripetal tightening action on the primary tubular body; and
    wherein an end portion of the primary tubular body axially projects relative to the one or more layers of semiconductive material of the coating sheath to carry out a sectionalization along the one or more layers of semiconductive material.

29. The junction of claim 28, wherein the one or more layers of semiconductive material of the coating sheath axially project, relative to the primary tubular body, on an axially opposite side from the sectionalization.

30. The junction of claim 28, wherein the one or more layers of semiconductive material define at least one surface portion of the coating sheath.

31. The junction of claim 28, wherein the one or more layers of semiconductive material have at least one end portion turned up over the coating sheath.

32. The junction of claim 31, wherein the at least one turned-up end portion is disposed substantially in axial alignment relationship with a first end of the one or more layers of semiconductive material.

33. The junction of claim 28, wherein the one or more layers of semiconductive material have at least one end portion turned up over the coating sheath, and
    wherein the at least one turned-up end portion is disposed close to the projecting end portion of the primary tubular body.

34. The junction of claim 28, wherein the primary tubular body has opposite ends axially projecting relative to the coating sheath.

35. The junction of claim 28, wherein the coating sheath axially projects from opposite sides relative to the primary tubular body.

36. The junction of claim 28, wherein the coating sheath further comprises:
    at least one layer of elastomer material coupled with the one or more layers of semiconductive material.

37. The junction of claim 36, wherein the at least one layer of elastomer material is applied internally of the one or more layers of semiconductive material.

38. The junction of claim 36, wherein the at least one layer of elastomer material is applied externally of the one or more layers of semiconductive material.

39. The junction of claim 28, further comprising:
    at least one electric-shielding element applied around the coating sheath and electrically connected to the shielding coating of at least one of the cables.

40. The junction of claim 39, wherein the at least one electric-shielding element extends at least partly against a semiconductive coating of at least one of the cables radially interposed between the shielding coating and the insulating coating.

41. The junction of claim 39, wherein the at least one electric-shielding element extends at least partly in contact with the one or more layers of semiconductive material.

42. The junction of claim 28, further comprising:
at least one protective layer of elastomer material applied around the covering sleeve.

43. A process for manufacturing a tubular covering sleeve for joints of electric cables, the process comprising:
preparing a primary tubular body comprising at least one annular insert of semiconductive material integrated into at least one layer of insulating material;
preparing a coating sheath comprising one or more layers of semiconductive material;
mechanically engaging the coating sheath in a resiliently radially expanded relationship around the primary tubular body so that the coating sheath engaged on the primary tubular body exerts a centripetal tightening action on the primary tubular body; and
moving apart an end portion of the one or more layers of semiconductive material from a geometric axis of the coating sheath to carry out a sectionalization along the one or more layers of semiconductive material.

44. The process of claim 43, wherein mechanically engaging the coating sheath around the primary tubular body comprises:
expanding the coating sheath from a rest condition, at which an inner diameter of the coating sheath is smaller than an outer diameter of the primary tubular body, to a radially expanded condition, at which the inner diameter of the coating sheath is larger than the outer diameter of the primary tubular body;
positioning the coating sheath around the primary tubular body in coaxial relationship; and
causing radial shrinkage of the coating sheath on the primary tubular body.

45. The process of claim 44, wherein expanding the coating sheath is carried out by engagement of the coating sheath in a resiliently expanded condition on an expanding mandrel.

46. The process of claim 45, wherein causing radial shrinkage of the coating sheath is carried out by axially pulling the expanding mandrel out of the coating sheath.

47. The process of claim 44, further comprising:
disposing the primary tubular body in a radially expanded condition;
wherein disposing the primary tubular body in a radially expanded condition is carried out before positioning the coating sheath around the primary tubular body in coaxial relationship.

48. The process of claim 43, wherein before moving apart an end portion of the one or more layers of semiconductive material, the one or more layers of semiconductive material extend along an axial extension larger than an axial extension of the primary tubular body.

49. The process of claim 43, wherein moving apart an end portion of the one or more layers of semiconductive material is carried out through material removal from the one or more layers of semiconductive material at the end portion.

50. The process of claim 49, wherein material removal from the one or more layers of semiconductive material at the end portion is carried out by mechanical abrasion.

51. The process of claim 49, wherein material removal from the one or more layers of semiconductive material at the end portion is carried out by cutting.

52. The process of claim 43, wherein moving apart an end portion of the one or more layers of semiconductive material is carried out by turning up the end portion over the coating sheath.

53. The process of claim 52, wherein first and second ends of the one or more layers of semiconductive material are brought into substantially mutual axial alignment relationship following turning up the end portion of the one or more layers of semiconductive material.

54. The process of claim 43, wherein moving apart an end portion of the one or more layers of semiconductive material is carried out before mechanically engaging the coating sheath around the primary tubular body.

55. The process of claim 43, wherein moving apart an end portion of the one or more layers of semiconductive material is carried out after mechanically engaging the coating sheath around the primary tubular body.

56. The process of claim 43, wherein mechanically engaging the coating sheath around the primary tubular body comprises:
expanding the coating sheath from a rest condition, at which an inner diameter of the coating sheath is smaller than an outer diameter of the primary tubular body, to a radially expanded condition, at which the inner diameter of the coating sheath is larger than the outer diameter of the primary tubular body;
positioning the coating sheath around the primary tubular body in coaxial relationship; and
causing radial shrinkage of the coating sheath on the primary tubular body;
wherein moving apart an end portion of the one or more layers of semiconductive material is carried out before causing radial shrinkage of the coating sheath set in a radially expanded condition.

57. The process of claim 43, wherein during preparing a coating sheath, at least one layer of elastomer material is coupled with the one or more layers of semiconductive material.

58. The process of claim 57, wherein the at least one layer of elastomer material is coupled internally of the one or more layers of semiconductive material.

59. The process of claim 57, wherein the at least one layer of elastomer material is coupled externally of the one or more layers of semiconductive material.

60. The process of claim 57, wherein the at least one layer of elastomer material is coupled with the one or more layers of semiconductive material by co-extrusion.

61. The process of claim 57, wherein the at least one layer of elastomer material is made separately from and mechanically coupled to the one or more layers of semiconductive material.

62. The process of claim 43, further comprising:
disposing the primary tubular body in a radially expanded condition.

63. The process of claim 62, wherein disposing the primary tubular body in a radially expanded condition is carried out by engagement of the primary tubular body in a resiliently expanded condition on a primary tubular support.

64. The process of claim 62, wherein disposing the primary tubular body in a radially expanded condition is carried out after mechanically engaging the coating sheath in a resiliently radially expanded condition around the primary tubular body.

65. A tubular covering sleeve for joints of electric cables, the tubular covering sleeve comprising:
a primary tubular body comprising at least one annular insert of semiconductive material integrated into at least one layer of insulating material; and
a coating sheath comprising one or more layers of semiconductive material mechanically engaged in a condition of resilient radial expansion around the primary tubular body so as to exert a centripetal tightening action on the primary tubular body;
wherein an end portion of the primary tubular body axially projects relative to the one or more layers of semiconductive material of the coating sheath to carry out a sectionalization along the one or more layers of semiconductive material.

66. The sleeve of claim 65, wherein the one or more layers of semiconductive material of the coating sheath axially project, relative to the primary tubular body, on an axially opposite side from the sectionalization.

67. The sleeve of claim 65, wherein the coating sheath further comprises:
at least one layer of elastomer material coupled with the one or more layers of semiconductive material.

68. The sleeve of claim 67, wherein the at least one layer of elastomer material is coupled at a radially internal position relative to the one or more layers of semiconductive material.

69. The sleeve of claim 67, wherein the at least one layer of elastomer material is coupled at a radially external position relative to the one or more layers of semiconductive material.

70. The sleeve of claim 65, wherein the one or more layers of semiconductive material have an end portion turned up over the coating sheath.

71. The sleeve of claim 70, wherein the turned-up end portion is substantially disposed in axial alignment relationship with a first end of the one or more layers of semiconductive material.

72. The sleeve of claim 65, wherein the one or more layers of semiconductive material have an end portion turned up over the coating sheath, and
wherein the turned-up end portion is disposed close to the projecting end portion of the primary tubular body.

73. The sleeve of claim 65, wherein the primary tubular body has opposite ends axially projecting relative to the coating sheath.

74. The sleeve of claim 65, wherein the coating sheath axially projects from opposite sides relative to the primary tubular body.

75. The sleeve of claim 65, further comprising:
a primary tubular support carrying the primary tubular body in a radially expanded condition.

* * * * *